June 2, 1970  H. FINNSTRAND  3,515,116
UTENSIL HOLDER FOR A COOKING UNIT
Filed May 24, 1968  3 Sheets-Sheet 1
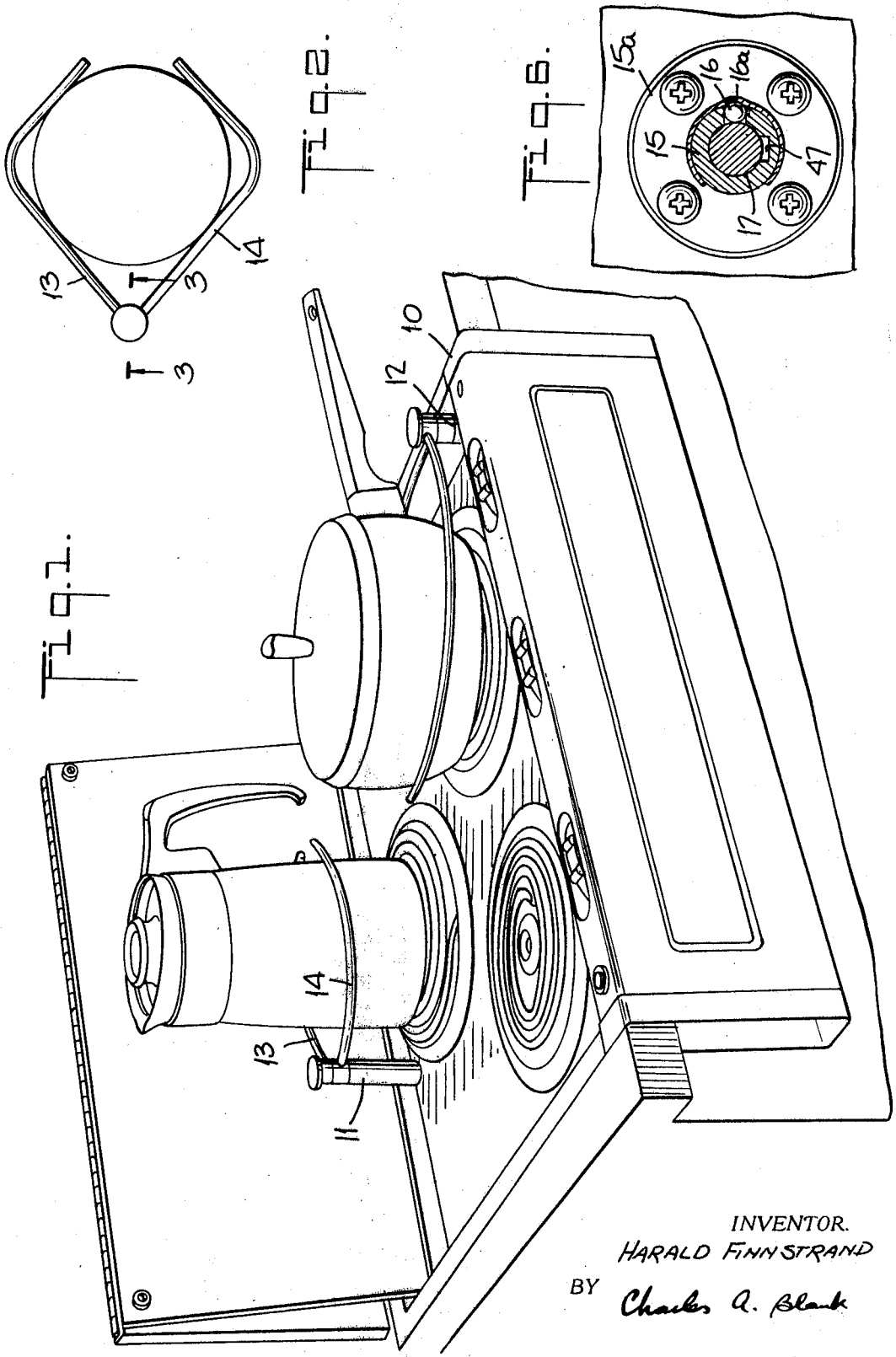
INVENTOR.
HARALD FINNSTRAND
BY Charles A. Black
ATTORNEY June 2, 1970   H. FINNSTRAND   3,515,116
UTENSIL HOLDER FOR A COOKING UNIT
Filed May 24, 1968   3 Sheets-Sheet 2
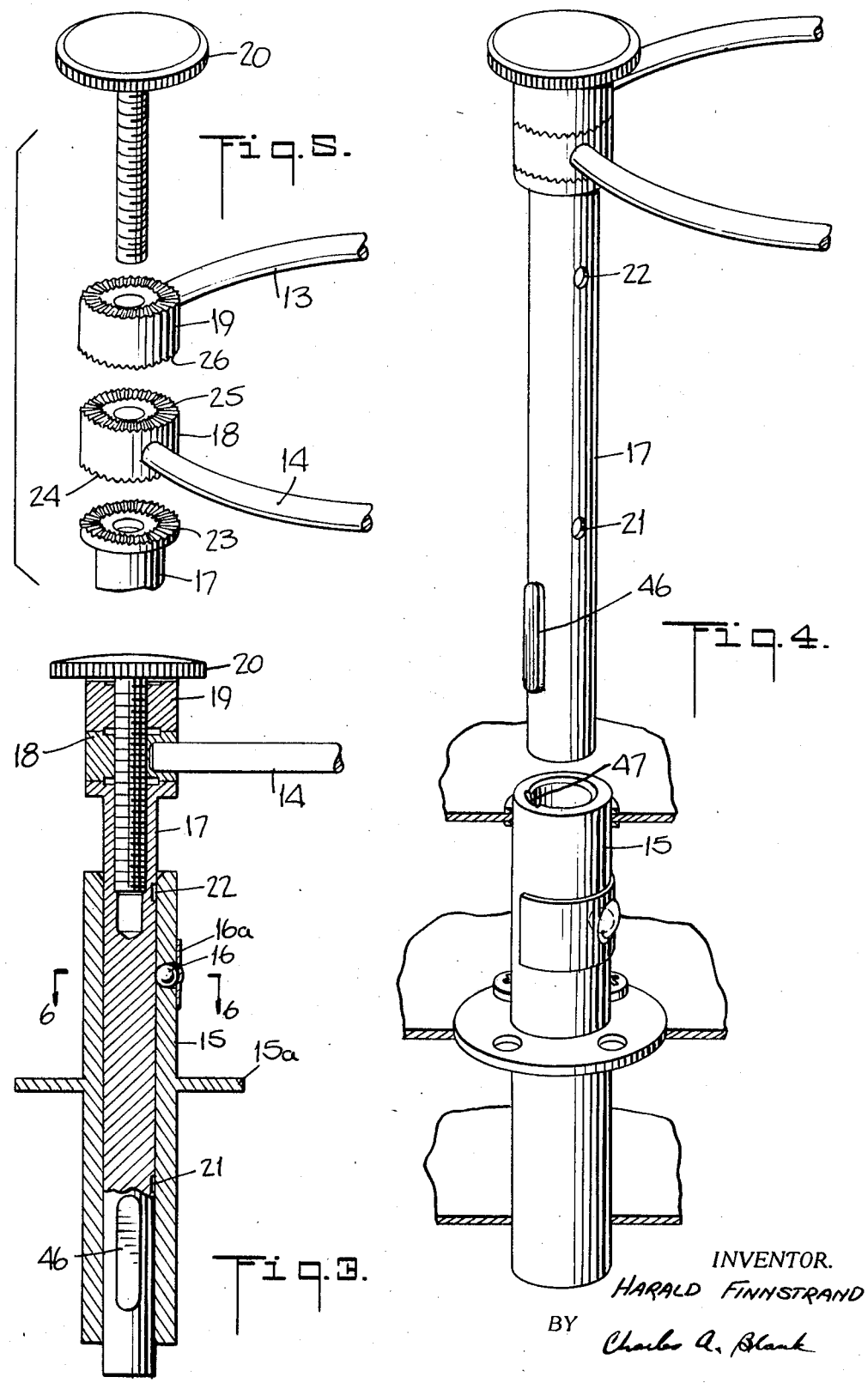
INVENTOR.
HARALD FINNSTRAND
BY Charles A. Blank
ATTORNEY

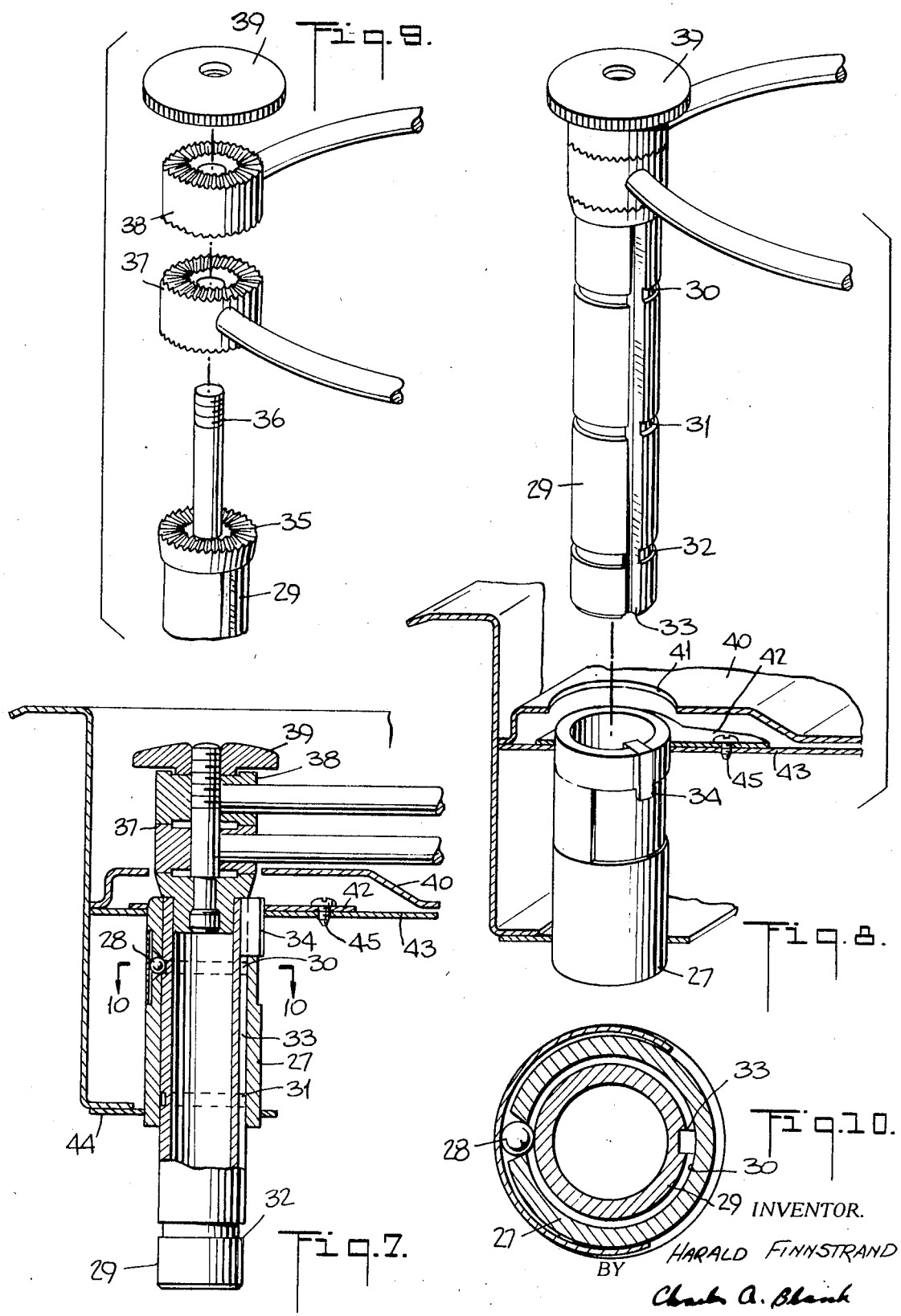

United States Patent Office 3,515,116
Patented June 2, 1970

3,515,116
UTENSIL HOLDER FOR A COOKING UNIT
Harald Finnstrand, Pelham, N.Y., assignor, by mesne assignments, to Automation Industries, Inc., Los Angeles, Calif., a corporation of California
Filed May 24, 1968, Ser. No. 731,785
Int. Cl. F24c 3/12, 15/10
U.S. Cl. 126—24                                    13 Claims

ABSTRACT OF THE DISCLOSURE

A stove or cooking unit for the galley of a boat is provided with a vertically adjustable utensil holder preferably having a pair of arms arranged to confine a cooking vessel therebetween. The arms extend from a common support and are laterally adjustable relative to one another. Means are provided to lock the arms in a selected lateral position and means are provided to retain the above-mentioned support in any of a plurality of vertically adjusted positions to accommodate cooking vessels of different heights.

BACKGROUND OF THE INVENTION

This invention relates to utensil holders for use in conjunction with cooking units, for example, marine galley stoves.

Galley stoves equipped with means for securing pots and other cooking utensils against sliding movement over the surfaces of the stoves are well known. In such known stoves, however, the utensil holders are generally fixed insofar as vertical elevation is concerned and are designed to engage a pot or other vessel peripherally only adjacent its lowermost region. Utensil holders with laterally adjustable arms to accommodate vessels of different widths are known, but these holders generally depend on the frictional effects of tightening lock nuts to hold the arms in position.

SUMMARY

In accordance with the invention, a utensil holder for a cooking unit comprises at least one adjustably positioned arm for engaging a utensil on the unit. The utensil holder also includes means supporting the arm for enabling the lateral adjustment of the arm and for locking the arm in a selected position of lateral adjustment, the supporting means being vertically adjustable for adjusting the arm to a desired height.

BRIEF DESCRIPTION OF THE DRAWINGS

For a better understanding of the present invention, together with other and further objects thereof, reference is made to the following description taken in connection with the accompanying drawings, wherein;

FIG. 1 is a perspective, front, elevational view of a galley stove equipped with utensil holders according to the present invention;

FIG. 2 is a top end view of a utensil holder of FIG. 1 according to the present invention;

FIG. 3 is a fragmentary, sectional view, to an enlarged scale, taken along the line 3—3 of FIG. 2;

FIG. 4 is a fragmentary, exploded, elevational view, to an enlarged scale, of a FIG. 1 utensil holder in accordance with one embodiment of the present invention;

FIG. 5 is a fragmentary, exploded, elevational view, to an enlarged scale, representing means for locking the vessel-embracing arms of the FIG. 1 utensil holder in position;

FIG. 6 is a sectional view of the FIG. 1 utensil holder, taken along the line 6—6 in FIG. 3;

FIG. 7 is a fragmentary, partly sectional, elevational view, to an enlarged scale, of a utensil holder according to another embodiment of the present invention;

FIG. 8 is a fragmentary, exploded, elevational view, of the utensil holder of FIG. 7;

FIG. 9 is a fragmentary, exploded, elevational view of the FIG. 7 utensil holder, representing means for locking the arms of the utensil holder of FIGS. 7 and 8 in position; and FIG. 10 is a sectional view, to an enlarged scale, of the FIG. 7 utensil holder, taken along the line 10—10 in FIG. 7.

DETAILED DESCRIPTION OF THE DRAWINGS

Referring now more particularly to FIG. 1 of the drawings, there is represented a cooking unit which preferably is a galley stove 10 having, for example, alcohol or electric burners of a type described in my Pat. 3,230,947 entitled Cooking Unit and issued Jan. 25, 1966. The stove is represented in FIG. 1 as having a pair of utensil holders 11, 12, each being adjusted to the proper height and proper lateral opening determined in accordance with the dimensions of the cooking vessels on the cooking unit. The utensil holder 11 comprises at least one and preferably two adjustably positioned arms for engaging a utensil on the unit.

Referring for the moment to FIGS. 2 and 3, the holder includes means supporting the arms for enabling lateral adjustment of the arms and for locking the arms in a selected position of lateral adjustment, the supporting means being vertically adjustable for adjusting the arms to a desired height. The supporting means comprises a sleeve 15 mounted on the galley stove 10 and having in a drilled radial hole in the sleeve 15 a ball 16, spring-loaded by spring member 16a, for engaging the shaft 17. A pair of hubs 18 and 19 are engaged with each other and with the shaft 17 and are maintained in position by a screw 20.

As represented in FIG. 4, the shaft 17 preferably has a pair or a number of apertures 21 and 22 therein at different heights to aid in positioning the shaft 17 within the sleeve 15. The ball 18 engages the shaft 17 within the sleeve 15 at one of the apertures therein and holds the shaft 17 in position until another height is selected. As represented in FIG. 3, the shaft 17 will also remain in position within the sleeve 15 with the ball 16 at positions other than at the apertures 21 and 22. At such positions other than at apertures 21 and 22, the ball 16 is pushed outwardly to a slight degree and rests against the cylindrical surface of shaft 17 with a force sufficient to retain the shaft 17 at the selected height. Positioning the shaft 17 so that the ball 16 is in one of the apertures of the shaft 17 allows the operator to feel the vertical adjustment of the shaft 17 in selected positions. In FIG. 6 the horizontal flange 15a welded or brazed to the sleeve 15 is represented as being attached to the base plate of the stove to support the utensil holder. Still referring to FIGS. 3, 4, and 6, a key 46 on the shaft 17 is provided to engage a vertical slot or keyway 47 inside the sleeve 15 and along the full length of the sleeve 15 for keying the shaft 17 and sleeve 15 together, thus preventing any relative rotation of these parts.

Referring to FIG. 5, which is a fragmentary, exploded view of the hubs of the arms 13, 14 and shaft 17, the shaft 17 has a knurled face 23 for engaging a correspondingly knurled face 24 of the hub 18 supporting arm 14. The knurled face 25 of the hub 18 engages the correspondingly knurled face 26 of the hub 19 supporting arm 13. A finger adjustable screw 20 maintains the hubs in their selected positions by tightening the radially extending knurls of the hubs against each other and against the radially extending knurls of the shaft 17. Thus, in operation, the screw 20 may be loosened to enable lateral adjustment of the arms 13, 14. The shaft 17 may be raised and lowered without loosening the screw 20 to select the desired height for the arms 13, 14. The shaft 17 may also be removed from sleeve 15 if desired.

Referring now more particularly to FIGS. 7 to 10 of the drawings, sleeve 27 utilizes a spring-loaded ball 28 for engaging shaft 29 supported by the sleeve. As is apparent in the exploded view of FIG. 8, the shaft 29 has therein horizontal grooves 30, 31 and 32 for engagement with the spring-loaded ball 28 at selected bottom, intermediate, and top positions of shaft 29. Positioning the shaft 29 so that the ball 28 is not at any of the grooves 30, 31, 32 may also be done to select a desired vertical height for the shaft 29 and the shaft 29 is retainable in such selected positions. A vertical slot 33 engages a key 34 on the sleeve 27 for keying the sleeve and the shaft together horizontally.

As represented in FIG. 8, a utensil plate 40 in which the burners are located and on which utensils rest has an aperture 41 therein through which the shaft 29 extends. A flange 42 is welded or brazed to the sleeve 27 and is attached to frame 43 of the stove to prevent the sleeve 27 from rotating. As represented in FIG. 7, a bracket 44 is welded to the lower flange of the stove frame and has an aperture through which sleeve 27 extends for guiding the sleeve.

As represented in FIG. 9, the face 35 of the shaft 29 is knurled similarly to the face 23 of the shaft 17 of FIG. 3. The faces of the hubs 37, 38 are knurled similarly to hubs 18, 19 of FIG. 5. The shaft 29 has a threaded screw portion or stud 36 extending through the hubs 37, 38 into engagement with a suitable finger adjustable nut 39. Vertical adjustment of the shaft 29 in the sleeve 27 can be made readily by manually raising or lowering the shaft 29.

The use of grooves 30, 31, 32 extending around the shaft 29 eliminates the need for precise relative angular, that is, horizontal, positioning between the shaft 29 and the ball 28 in the sleeve 27 when making the parts. The nut 39 can be loosened to allow lateral adjustment of the hubs 37, 38 and the arms extending therefrom and may thereafter be tightened to cause locking of the knurled faces of the shaft 29 and the hubs 37, 38.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A utensil holder for a cooking unit comprising:
a sleeve mounted on the unit;
a vertically adjustable shaft supported by said sleeve and having a knurled lateral face;
a pair of hubs supported by said shaft;
a pair of arms supported by said hubs, said hubs having knurled faces for engaging the knurled face of said shaft and for engaging each other for locking the arms in selected positions of lateral adjustment.

2. A utensil holder in accordance with claim 1, which includes means for preventing said shaft and said sleeve from rotating in relation to each other around their common vertical axis.

3. A utensil holder in accordance with claim 1 which includes means for keying said sleeve and said shaft together horizontally including a key on said sleeve and a vertical slot in said shaft to enable vertical adjustment of said shaft in said sleeve and in which said sleeve has a spring-loaded member and in which said shaft has horizontal grooves for engaging said spring-loaded member of said sleeve at selected vertical positions along said shaft.

4. A utensil holder in accordance with claim 1 which includes means for keying said sleeve and said shaft together horizontally including a key on said shaft and a vertical slot inside said sleeve to enable vertical adjustment of said shaft in said sleeve and in which said sleeve has a spring-loaded member and in which said shaft has apertures therein for engaging said spring-loaded member of said sleeve at selected vertical positions along said shaft.

5. A utensil holder for a cooking unit comprising:
a sleeve vertically mounted on said unit;
a shaft being disposed in slidable engagement with said sleeve;
first means for releasably restricting the slidable movement of said shaft within said sleeve;
a pair of horizontal arms swingably extending from said shaft; and
second means for releasably restricting movement of said arms with relation to said shaft.

6. The utensil holder as defined in claim 5 wherein said second means including:
a pair of hubs disposed upon said shaft, each hub including a knurled face, the knurled faces of said hubs being adapted to be positioned in engagement with each other, said pair of arms being mounted to one of said hubs and the other hub being secured to said shaft; and
means for releasably tightening one hub upon the other hub to prevent rotation of said pair of hubs relative to one another and said shaft.

7. The utensil holder as defined in claim 5 wherein said first means including:
ball detent means being disposed in a slot in said sleeve and being adapted to engage said shaft, said sleeve defining apertures therein to receive said ball detent means; and
means for biasing said ball detent means towards said shaft.

8. The utensil holder as defined in claim 5 wherein:
said second means including a pair of hubs disposed upon said shaft, each hub including knurled faces, the knurled faces of said hubs being adapted to be positioned in engagement with each other, said pair of arms being mounted to one of said hubs and the other hub being secured to said shaft, and means for releasably tightening one hub upon the other to prevent rotation of said hubs relative to one another and said shaft; and
said first means including ball detent means being disposed in a slot in said sleeve and being adapted to engage said shaft, said sleeve defining apertures therein to receive said ball detent means, and means for biasing said ball detent means against said shaft.

9. A cooking stove including a top surface and at least one burner thereon, at least one utensil holder mounted on the surface of said stove, said utensil holder including:
a shaft extending normal to the surface of said stove and adjacent the burner thereof, said shaft being extendable in height with relation to the surface of said stove; and
a pair of arms swingably mounted to said shaft and extending horizontal with respect to the surface of said stove said arms being adapted to engage the utensils.

10. The cooking stove as defined in claim 9 wherein said utensil holder further including means for releasably locking said arms into engagement with the utensils.

11. In the cooking stove as defined in claim 9 said utensil holder further including means for locking the movement of said shaft with relation to the surface of said stove at predetermined positions.

12. The cooking stove as defined in claim 9 wherein said utensil holder further including:
means for releasably locking said arms into engagement with the utensils; and
means for locking the movement of said shaft with relation to the surface of said stoves at predetermined positions.

13. In a cooking stove having a stove top with at least one heater thereon for applying heat to a utensil positioned on the heater, a utensil holder including:
- a support adapted to be disposed on the stove in relative proximity of the heater;
- utensil retainer being mounted on said support and being adapted to engage a utensil seated on the heater;
- adjusting means on said retainer for securing the utensil in position on the heater; and
- second adjusting means mounted on said support for providing vertical movement of the utensil retainer means relative to the stove top for engaging said utensil at a different height from said top.

References Cited

UNITED STATES PATENTS

| | | | |
|---|---|---|---|
| 377,454 | 2/1888 | Hatch | 126—24 |
| 1,645,466 | 10/1927 | Westlake | 126—24 |
| 2,379,206 | 6/1945 | Westlake | 126—24 |
| 3,198,189 | 8/1965 | Oatley | 126—24 |

CHARLES J. MYHRE, Primary Examiner

U.S. Cl. X.R.

126—42, 211